(12) United States Patent
Zanchettin et al.

(10) Patent No.: US 11,673,270 B2
(45) Date of Patent: Jun. 13, 2023

(54) PREDICTIVE CONTROL METHOD OF A ROBOT AND RELATED CONTROL SYSTEM

(71) Applicants: POLITECNICO DI MILANO, Milan (IT); SMART ROBOTS S.R.L., Milan (IT)

(72) Inventors: Andrea Maria Zanchettin, Milan (IT); Luigi Piroddi, Milan (IT); Paolo Rocco, Milan (IT); Andrea Casalino, Vercelli (IT)

(73) Assignees: POLITECNICO DI MILANO, Milan (IT); SMART ROBOTS S.R.L., Milan (IT)

( * ) Notice: Subject to any disclaimer, the term of this patent is extended or adjusted under 35 U.S.C. 154(b) by 352 days.

(21) Appl. No.: 16/973,170

(22) PCT Filed: Jun. 7, 2019

(86) PCT No.: PCT/IB2019/054763
§ 371 (c)(1),
(2) Date: Dec. 8, 2020

(87) PCT Pub. No.: WO2019/234700
PCT Pub. Date: Dec. 12, 2019

(65) Prior Publication Data
US 2021/0252706 A1 Aug. 19, 2021

(30) Foreign Application Priority Data
Jun. 8, 2018 (IT) .................. 102018000006156

(51) Int. Cl.
*B25J 9/16* (2006.01)
(52) U.S. Cl.
CPC ........... *B25J 9/1666* (2013.01); *B25J 9/1697* (2013.01)
(58) Field of Classification Search
CPC ...... B25J 9/1666; B25J 9/1697; B25J 9/1602; G05B 2219/40413
See application file for complete search history.

(56) References Cited

U.S. PATENT DOCUMENTS

2011/0184555 A1* 7/2011 Kosuge ............... B25J 11/00
700/245

FOREIGN PATENT DOCUMENTS

JP         2006227983 A  *  8/2006
WO   WO-2012065175 A2    5/2012
(Continued)

OTHER PUBLICATIONS

Hawkins, K.P., et al., "Probabilistic human action prediction and wait-sensitive planning for responsive human-robot collaboration," *2013 13th IEEE-RAS International Conference on Humanoid Robots (Humanoids)*—Atlanta, GA, United States (Oct. 15-17, 2013), pp. 499-506, Institute of Electrical and Electronics Engineers, United States (2013).

(Continued)

*Primary Examiner* — Adam R Mott
*Assistant Examiner* — Byron Xavier Kasper
(74) *Attorney, Agent, or Firm* — Sterne, Kessler, Goldstein & Fox P.L.L.C.

(57) ABSTRACT

This disclosure relates to a method of controlling a collaborative robot, or "cobot". According to the disclosed method the "cobot" is controlled so as to make it ready to perform a task in collaboration with the human operator only when the latter is about to move into a work sector to carry out the task collaborating with the robot. The control method of the present disclosure can be implemented by means of a control system comprising detection devices, such as for example one or more cameras or a mat equipped with sensors, which detect the position of the hands or of the entire body of the operator in the space of work, a memory in which to store identification data of the sectors of work engaged by the human operator, of the times of permanence in them and of the successive sectors of work in which the human operator moves, as well as a control microprocessor unit which (Continued)

processes this data stored in the memory according to the method of this disclosure to predict in which work sector the operator will move his hands and when that will happen, and which controls a robot based on this prediction information. The method of this disclosure can be implemented by means of software executed by a microprocessor unit.

7 Claims, 6 Drawing Sheets

(56) References Cited

FOREIGN PATENT DOCUMENTS

| WO | WO-2017163251 A2 * | 9/2017 | ............ B25J 9/1676 |
| WO | WO-2019234700 A1 | 12/2019 | |

OTHER PUBLICATIONS

International Search Report and Written Opinion for International Application No. PCT/IB2019/054763, European Patent Office, Netherlands, dated Oct. 8, 2019, 17 pages.

Zanchettin, A.M., et al., "Probabilistic inference of human arm reaching target for effective human-robot collaboration," *2017 IEEE/RSJ International Conference on Intelligent Robots and Systems (IROS)*—Vancouver, BC, Canada (Sep. 24-28, 2017), pp. 6595-6600, Institute of Electrical and Electronics Engineers, United States (2017).

* cited by examiner

PREDICTIVE CONTROL METHOD OF A ROBOT AND RELATED CONTROL SYSTEM

TECHNICAL FIELD

The present disclosure relates to robot control methods and more particularly a method for controlling a robot intended to cooperate with a human operator, predicting the activity that the human operator is about to perform in order to be prepared to comply with it, as well as a system a control microprocessor of a robot and a related computer program.

TECHNOLOGICAL BACKGROUND

With the development of robotics, it is foreseeable that in the future the presence of robots designed to collaborate with human operators will increase, in order to help operators during execution of their work. In particular, robots may conveniently be used to quickly accomplish tasks in a substantially mechanical manner, while human operators may accomplish the most difficult tasks to be performed autonomously from robots.

Thanks to the improved motion control procedures of industrial robots, it has been possible to realize robots that can autonomously perform tasks sharing a work space with one or more human operators. This solution allows the coexistence of a robot with a human operator in a same environment, in which however each or the two subjects must complete his task independently of the other, achieving his own objective.

However, this type of subdivision is not always practicable when a job to be performed is composed of both operations that require human intelligence, as well as mechanical operations, which can be individually performed without knowing all the work to be done and the purposes to be achieved. In general, in all those jobs where there are operations that require a high level of understanding, which human operators can easily perform but which robots cannot easily accomplish unless sophisticated and expensive technology is used, which would require significant investments and would increase production costs, the assignment of the entire work to a human operator appears indispensable.

To overcome this limitation, collaborative robots are realized, sometimes called with the neologism "cobot" or "co-robot", that can collaborate with human operators sharing the same work space and interacting closely and synergistically with them to achieve a desired result. For example, a task that could be performed by a "cobot" could be the one schematically illustrated in FIG. 1. The human operator can act in one of the four work sectors identified with the numbers from 1 to 4, working in the sectors from 1 to 3 and releasing a piece in sector 4, and the robot must perform another task while the human operator works in sectors 1 to 3, and interrupt his task to take the piece from sector 4 and move it elsewhere as soon as it is deposited.

Solutions are available that are essentially based on careful planning of the different tasks assigned to the human operator rather than the robot, but they prove not particularly flexible or efficient. In particular, a limit to the close collaboration between robots and human operators is the fact that human operations are not always strictly repeated in a same way or with a same duration. For example, small delays on the planned working times of the human operator cause a loss of the robot working efficiency, which can remain stationary relatively long waiting a piece in sector 4, instead of interrupting its activity only when the human operator is actually to release the workpiece.

SUMMARY

To overcome these limitations, a procedure has been devised for predicting the activity of a human operator, usable in a control method of a robot so as to make it ready to perform a task in collaboration with the human operator only when the latter is about to move into a work sector to carry out the task collaborating with the robot.

The predictive control method of the present disclosure can be implemented by means of a control system comprising detection devices, such as for example one or more cameras or a mat equipped with sensors, which detect the position of the hands or of the entire body of the operator in the work space, a memory in which to store identifying data of the sectors of work engaged by the human operator, of the residence times in them and of the subsequent work sectors in which the human operator moves, as well as a control unit to microprocessor which processes these data stored in the memory according to the method of this disclosure to predict in which field of work the operator will move his hands and when that will happen, and that controls a robot based on this prediction information.

The method of this disclosure can be implemented by means of software executed by a microprocessor unit.

The claims as filed are an integral part of this disclosure and are incorporated herein by express reference.

DETAILED DESCRIPTION

To improve the performance of a job that requires the synergistic cooperation of a human operator with a collaborative robot ("cobot"), a method has been devised to predict the activities of the human operator so that the robot can prepare to perform its task when the human operator is about to finish his task, using the remaining time in other activities, as well as to be ready when the operation needs to be carried out simultaneously by the operator and by the robot (such as the transport of a bulky or heavy object). Substantially, the method of this disclosure allows:

to predict which activity of the human operator will most likely be undertaken at the end of the current activity;

to predict when a given human operator activity will start for which robot assistance or synchronization with this is required.

For example, the method of this disclosure can be usefully implemented in assembly tasks in which both the human operator and the robot have individual sub-tasks to be performed and a joint action must be performed to finalize the assembly. The task to be performed in collaboration requires that the human operator and the robot be available at the same time, while other sub-tasks assigned individually to the robot and to the human operator can be performed at any other time.

According to the present disclosure, the work space of the human operator is divided into work sectors that can be occupied by the operator's hands or by the entire body of the operator. It detects the positions of the hands or of the operator's body during the work, how much time hands (or the entire operator's body) remain in a certain work sector and what is the sector of the next task in which the operator will move when he leaves the current work sector. Observing the operator at work, records are stored in a database indicating at least the current work sector and the time spent in it.

Figure 2:
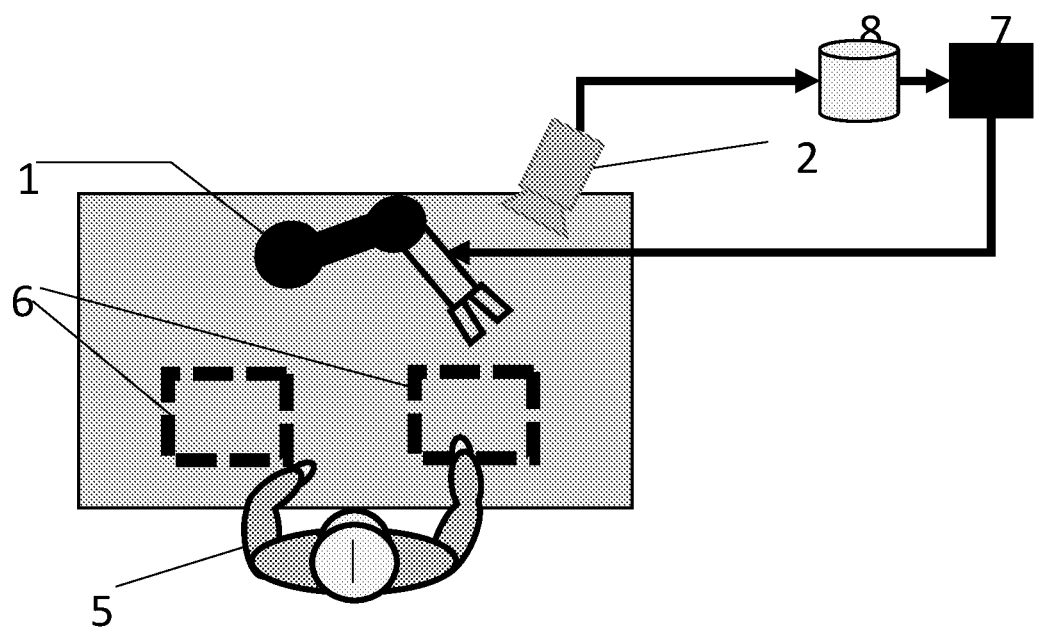
FIG. 2 illustrates a control system, according to an embodiment of the present disclosure, of a fixed robotic arm which cooperates with an operator at a work table and which moves only his hands between two work sectors.
Figure 3:
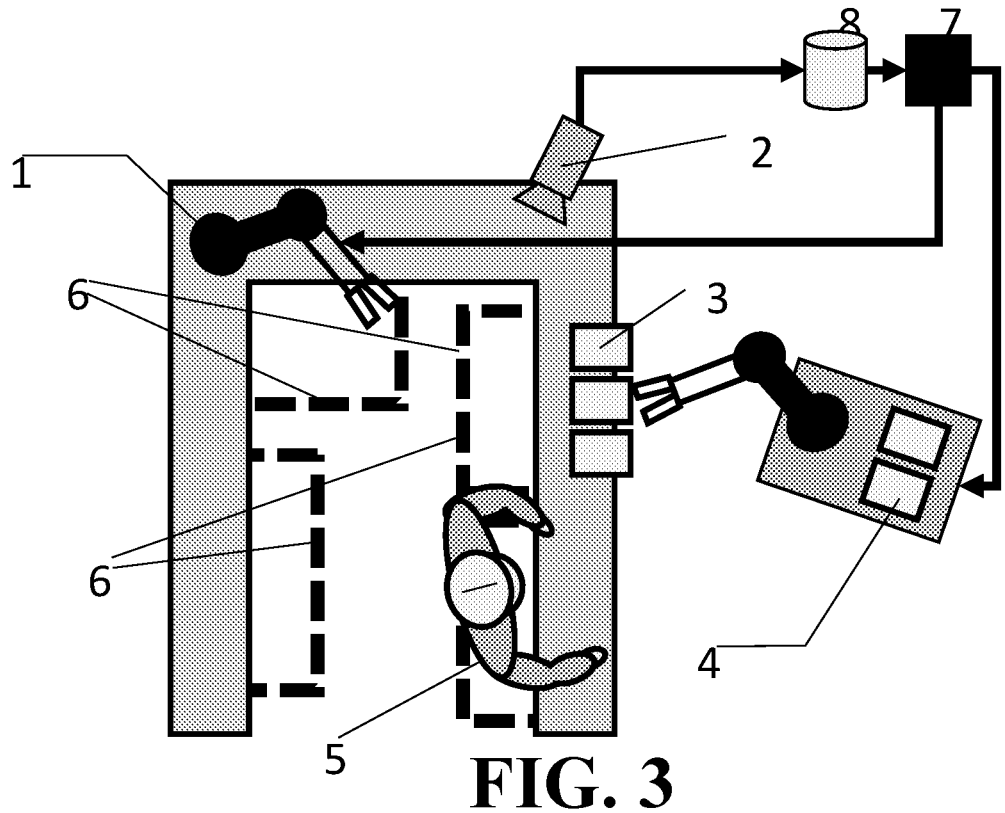
FIG. 3 shows another control system, according to another embodiment of the present disclosure, of a fixed robotic arm and a mobile robot which cooperate with an operator.

The method is implemented by means of a control system, as shown in FIGS. 2 and 3, which includes detection devices which detect the position of the hands or of the entire body of the operator. For example, FIG. 2 illustrates a control system, according to an embodiment of the present disclosure, of a fixed robotic arm 1 which cooperates with an operator 5, with the body substantially stationary compared to a work table, which moves only his hands between the two sectors 6 delimited by a dotted line. One or more cameras 2 detect the positions of the hands of the human operator 5 to establish in which of the sectors 6, respectively to the right and to the left of the operator, are the hands. The data on the position of the operator or his hands are processed so as to compose records that identify the current work sector, the time spent in it, and these records are stored in a database 8. A control unit 7 a microprocessor processes the records stored in the database 8 with the method of this disclosure to predict in which work sector the operator will move his hands and when that will happen, so as to command the robotic arm 1 so as to perform his sub-tasks as long as possible and not to be engaged when the operator needs his cooperation.

FIG. 3 shows another control system, according to another embodiment of the present disclosure, of a fixed robotic arm 1 and a mobile robot 4 which cooperate with an operator 5 that moves between the various work sectors 6 delimited by a dotted line. In this case, the human operator 5 must perform certain tasks, including the one of picking up objects from one or more containers 3, filled by the mobile robot 4, and then moving to other work sectors, possibly cooperating with the fixed robotic arm 1. Differently from the previous example, the human operator 5 is not seated at the work table but moves from one sector to another. The position of the operator's body 5 can be detected with one or more cameras 2 or with other devices for detecting the position of the operator, such as for example a mat with built-in sensors which detect the pressure exerted by the feet of the operator 5.

Beyond the fact that the operator moves from one sector to another or that stands still and move only his hands, and regardless of the detectors used to detect the body position of the operator 5 or of his hands, there are records containing the current work sector and the time spent in this work sector.

According to the method of this disclosure, indicating with $A_k$ a variable which represents the generic current work sector at the instant $t_k$ and with m the number of different work sectors in which the work space, in which the human operator 5 may act, is subdivided, we calculate the probability of a transition from the work sector $A_k$, occupied at the instant $t_k$, to the next work sector $A_{k+1}$ that will be occupied starting from the instant $t_{k+1}$ knowing that the operator has arrived at the work sector $A_k$ passing through the work sectors $A_{k-1}, \ldots, A_{k-n}$. In formulas:

$$P(A_{k+1}=a|A_k=k_0, \ldots, A_{k-n}=kk_n)$$

wherein $a, k_0, \ldots, k_n$ are possible values that identify a work sector. In practice, the conditional probability is calculated that the operator at time $t_{k+1}$ occupies the work sector "a" (identified by any integer from 1 to m) knowing that at the previous instants $t_k, t_{k-n}$ the human operator occupied the work sectors $k_0, \ldots, k_n$. In general, the calculation of this transition probability poses considerable difficulties as the number of parameters to be considered increases exponentially with the length "n" of the sequence of previous transitions that are taken into account to predict the sector in which the operator will move at the time $t_{k+1}$.

To simplify the calculation of a transition probability like the one described above, in the article by A E Raftery "*A model for high-order Markov chains*", Journal of the Royal Statistical Society, Series B (Methodological) pp. 528-539, 1985, herein incorporated by reference, the following approximation was proposed:

$$P(A_{k+1} = a \mid A_k = k_0, \ldots, A_{k-n} = k_n) \approx \sum_{i=0}^{n} \lambda_i P(A_{k+1} = a \mid A_{k-i} = k_i)$$

where the values of parameters $\lambda_i$, positive reals, are determined so that $$\sum_{i=0}^{n} \lambda_i = 1$$

i.e. the probability of transition to the generic sector $A_{k+1}$ is a linear combination of the probability of transition from the sector $A_{k-i}$ to the sector $A_{k+1}$ regardless of the succession followed through intermediate work sectors, greatly reducing the number of parameters to be stored.

Indicating with $\{A_k\}$ the succession of work sectors who were engaged in terms of states and with $X_k$ the generic state column vector at step k, so that for example if $A_k=3$ then $X_k=[0\ 0\ 1\ 0\ \ldots\ ]^T$. The generic state column vector $\hat{X}_{k+1}$ represents the distribution of occupation probabilities of the work sector that is expected will be occupied for the execution of the task following the current one. Therefore, the formula that allows to calculate the probability of occupation of a generic work sector is as follows:

$$\hat{X}_{k+1} = \sum_{i=0}^{n} \lambda_i Q \cdot X_{k-i}$$

in which Q is the matrix of transition probabilities $$Q=\{\{P(A_{k+1}=a|A_{k-i}=k_i)\}\}$$

According to a more flexible mathematical model presented in the article by W K Ching et al., "*Higher-order Markov chain models for categorical data sequences*", Naval Research Logistics (NRL), vol. 51, no. 4, pp. 557-574, 2004, incorporated herein by express reference, the transition probability matrix Q is updated at each step i:

$$\hat{X}_{k+1} = \sum_{i=0}^{n} \lambda_i Q_i \cdot X_{k-i}$$

Figure 4:
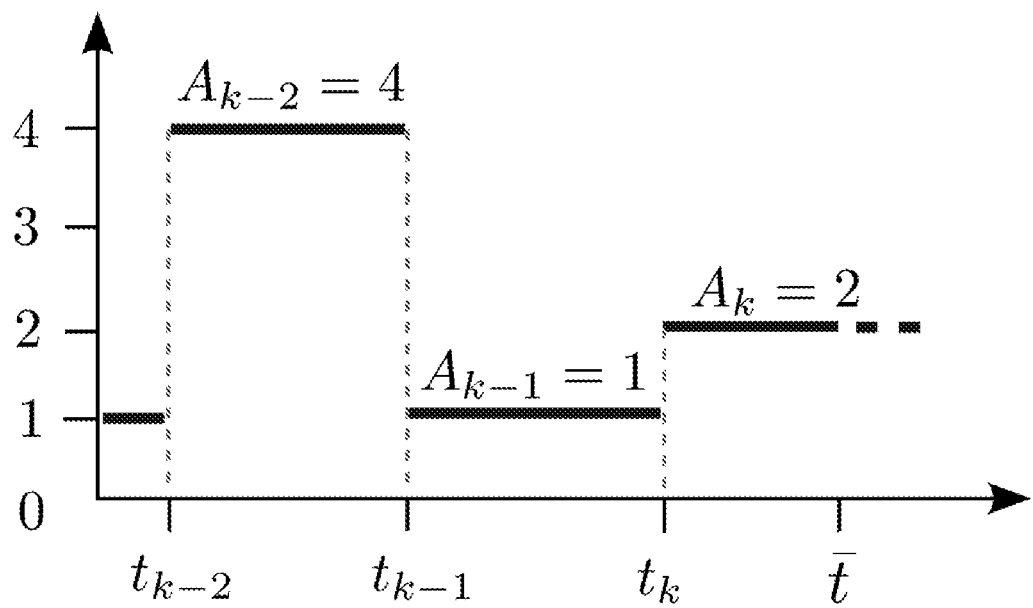
FIG. 4 shows an exemplary time chart that identifies the succession of occupation of the work sectors by a human operator.

In the method according to the present disclosure, by an appropriate choice of parameters $\lambda_i$ it is estimated in the previous formula the probability distribution of occupation of the work sectors after the currently occupied one. The cited article by Ching et al. also provides a procedure for estimating the parameters $\lambda_i$ based on the fact that the preceding formula admits a stationary distribution, but this procedure has proved to be unsuitable for use in the implementation of a control method of a "cobot", as it is less accurate than the one described in the present disclosure. To overcome this limitation and to implement a fast and accurate method to control a collaborative robot, the applicants verified that it is possible to quickly estimate the parameters A and the transition probability matrices $Q_i$ updating them at every step through observation of the execution of the work of the human operator. These method steps are performed thanks to the detectors of the position of the human operator and/or of his hands. For example, referring to the case illustrated in FIG. 1, through the observation of the work performed by the human operator, a time chart is determined as that of FIG. 4 which identifies the succession of the work sectors engaged by the operator. In practice, by observing the work performed by the human operator, the products $Q_i \cdot X_{k-i}$ are determined which represent the probability that the operator is currently in a given work sector when at the time k−i the operator occupied a certain work sector, then the parameters $\lambda_i$ are calculated so as to minimize the sum of square of differences, each one given by the following formula $$\|\hat{X}_{k+1} - X_{k+1}\|^2 = \left\|\sum_{i=0}^{n} \lambda_i Q_i \cdot X_{k-i} - X_{k+1}\right\|^2 ;$$

for each database entry, with the condition that $$\sum_{i=0}^{n} \lambda_i = 1$$

Once the probability distribution $\hat{X}_{k+1}$ that the operator moves in a generic work sector has been estimated, according to the method of this disclosure the robot is controlled on the basis of this probability distribution by making sure that the robot prepares to cooperate with the human operator if the probability that the operator is about to occupy a work sector dedicated to performing a cooperative task with a robot exceeds a pre-established threshold.

According to the method of the present disclosure, at the generic step k it is possible to estimate the probability distribution $\hat{X}_{k+1}$. Subsequently, only after having seen the real value of the state $A_{k+1}$, it is possible to recalculate the parameters $\lambda_i$ of the model, in order to make a more accurate forecast of the probability distribution $\hat{X}_{k+2}$ at the next step k+1.

The mathematical model, summarized by the two previous formulas, only allows to predict the probability of transition from one work sector to another work sector and does not consider the time spent by the operator in a work sector. These residence times must be estimated so that the robot can interrupt the sub-task it is performing independently, and can prepare to cooperate with the operator just in time when the operator is about to move. For this purpose, the residence time in a generic work sector "a" is estimated, i.e. the time required to perform the task in the sector "a", as a positive random variable $T^a$ which cannot be less than a positive value $T_{min}^a$ and this information is derived from the observation of the human operator at work.

The goal is to estimate a generic waiting time $\tau^a$ which is presumed it should pass before the human operator will go into a sector "a" in which he must perform an activity that requires the cooperation of the robot. The probability distribution of this waiting time $\tau^a$ is estimated knowing that the human operator is in the work sector $A_k$ and that he arrived in the sector "a" passing through the sectors $A_k, \ldots, A_{k-n}$:

$$P(\tau^a \leq t | A_k, \ldots, A_{k-n})$$

Figure 5:
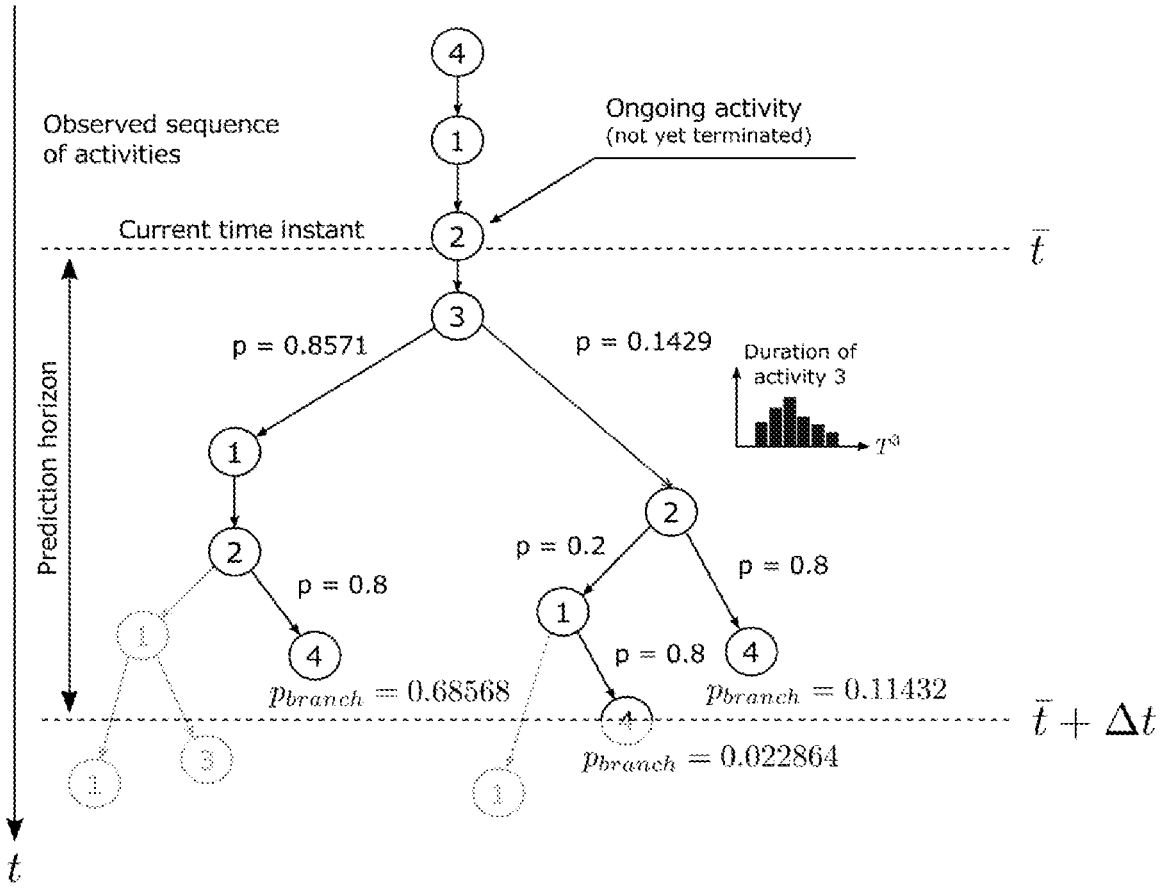
FIG. 5 illustrates an example of a reachability tree with representative branches of sequences of transitions that lead to a sector of work of interest passing through other work sectors in which the work space of the human operator is divided.

In theory, it would be necessary to construct a reachability tree that describes all the succession of transitions from one work sector to another sector and ending with the occupation of the work sector "a" to perform the related activity. Since this reachability tree could be infinite, the time horizon ΔT is limited i.e. the above indicated probability is calculated up to an instant t̄+ΔT wherein t̄ is the current instant. FIG. 5 illustrates an example of a reachability tree and the time horizon starting from the current instant t̄ assuming that the human operator is in the work sector 2 and that the waiting time for the human operator to move into the work sector 4 to perform an activity that requires the collaboration of the robot is to be forecast. As shown in the tree of FIG. 5, the operator can arrive in sector 4 coming from sector 2 or from sector 1. In the branch at left in the figure, when the operator has reached sector 2, only the oriented arc leading to the work sector 4 is considered since the other oriented arc leading to the work sector 1 does not lead to sector 4 within the time horizon ΔT.

Figure 6:
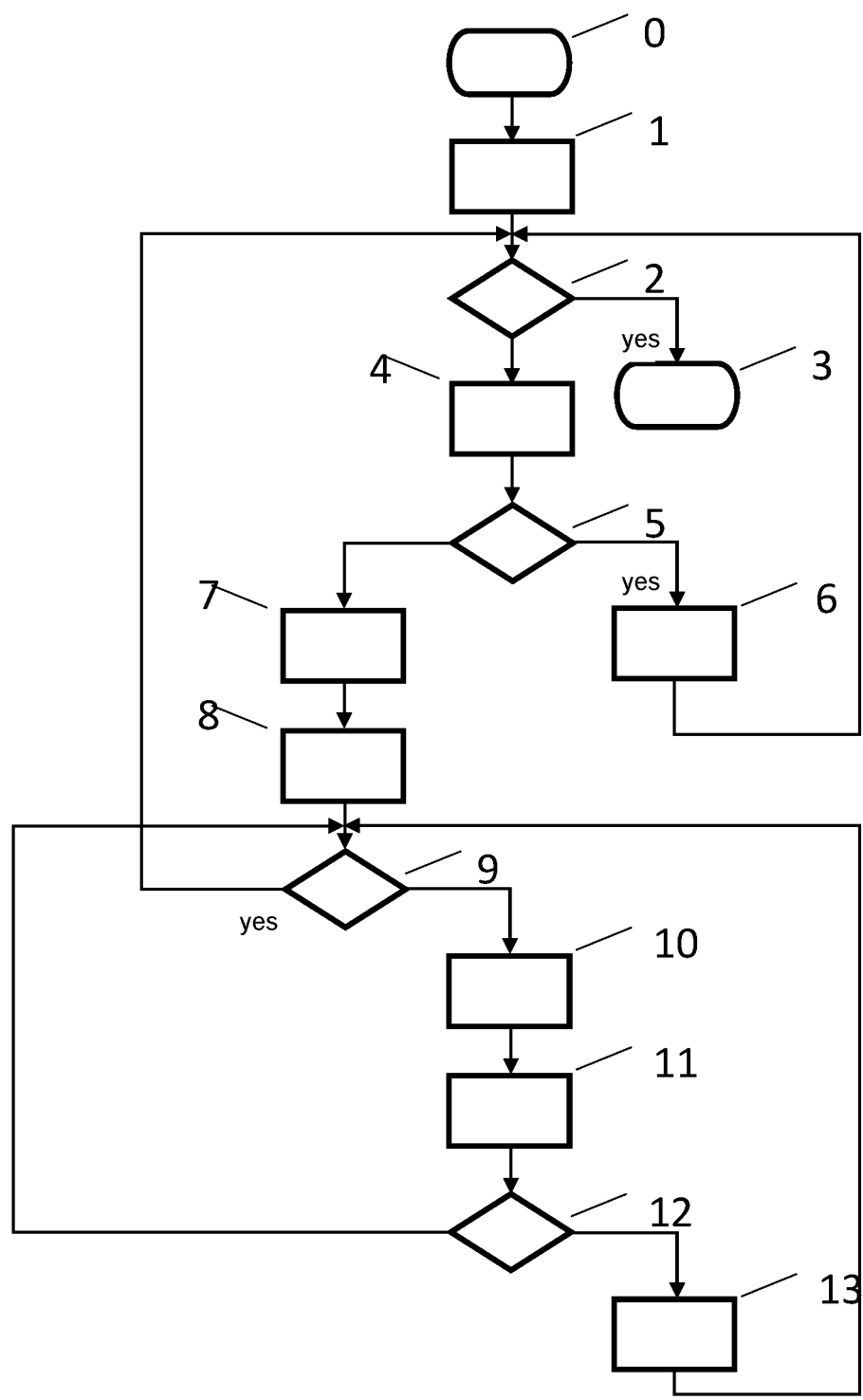
FIG. 6 is a flow chart which illustrates a procedure for determining the branches of a reachability graph that lead to a sector of interest before the expiry of a predetermined time horizon.

In general, any procedure can be used that allows to identify all the branches of the reachability tree that lead to the sector of interest "a" in which the human operator must perform the activity that requires the cooperation of the robot. According to an embodiment of the present disclosure, such a procedure can be the one synthetically illustrated by the flow diagram of FIG. 6, in which the numbers identify the operations indicated in the following table:

| 0 | Begin |
|---|---|
| 1 | Mark the root node of the graph as a node not yet expanded |
| 2 | If all the nodes of the tree have been expanded |
| 3 | End |

-continued

| 4  | Choose a tree node not yet expanded |
| --- | --- |
| 5  | If the chosen node corresponds to the sought activity |
| 6  | Mark this node as expanded |
| 7  | Calculation of probability distribution of the next activity |
| 8  | Hanging m nodes of the tree to the current node and associating to each transition the probability calculated at the previous point |
| 9  | If all new hanging nodes have been processed |
| 10 | Choose a new unprocessed node |
| 11 | Calculates $\tau_{branch}$ and $p_{branch}$ |
| 12 | If the minimum $\tau_{branch}$ is bigger than $\Delta T$ and/or $p_{branch}$ is less than a minimum threshold $\varepsilon$ |
| 13 | Mark the current node as expanded |

Once the branches of the reachability tree leading to the sector of interest are explored, the probability associated with each arc of the reachability tree is calculated by multiplying the probability of each transition p(i, j) from sector i to sector j described by the considered branch:

$$p_{branch} = \prod_{(i,j) \in branch} p(i, j)$$

The estimated waiting time to reach the end of the considered branch is given by the sum of the expected residence times in the various sectors of the branch, from sector i to sector j:

$$\tau_{branch} = \sum_{(i,j) \in branch} T^j$$

Given the distribution of the times associated with each branch, the overall distribution of the waiting times of the task to be performed in the work sector "a", in which the collaboration of the robot is required, can be calculated as the weighted sum of the waiting times associated with each branch (within the time horizon $\Delta T$) that leads to sector "a", that is:

$$P(\tau^a \leq t \mid A_k, \ldots, A_{k-n}) = \sum_{branch} p_{branch} P(\tau_{branch} \leq t)$$

When the method of this disclosure is performed continuously at a certain frequency, the estimates of waiting times and the probabilities of transition from one work sector to another can be updated iteratively.

Figure 7:
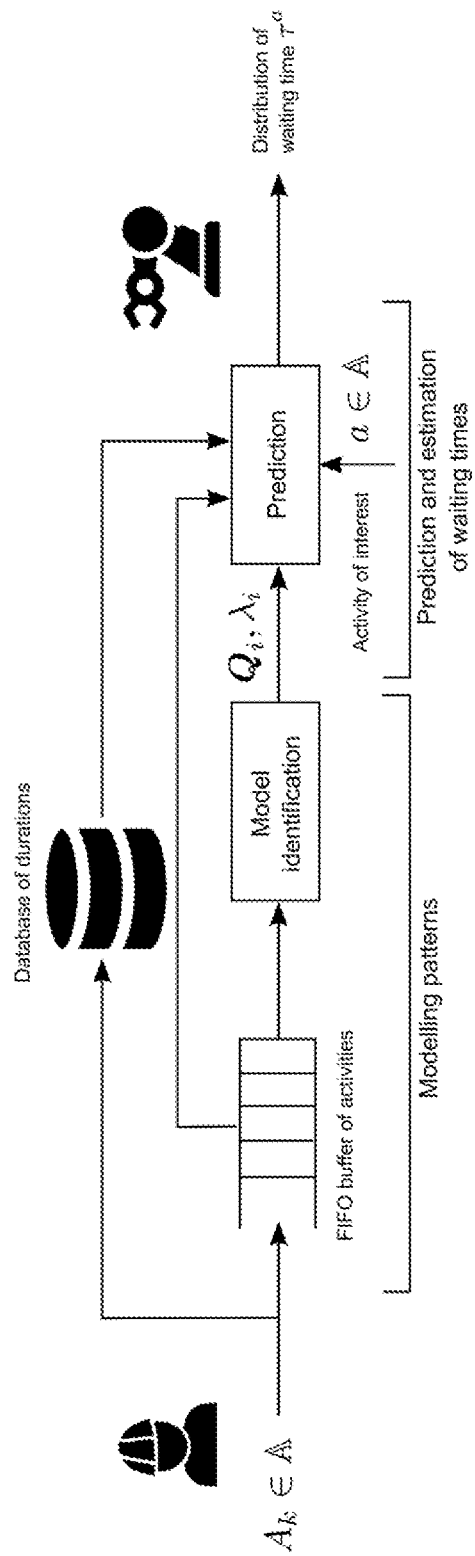
FIG. 7 shows a block diagram which synthetically illustrates the execution of steps of the control method according to the present disclosure.

A block diagram illustrating the method described above is shown in FIG. 7. Through cameras or other detection means the work sectors $A_k$ are identified as they are gradually occupied by the human operator in succession and the related residence times in each work sector. For example, the succession of occupied work sectors can be stored in a FIFO memory and the residence times in each work sector can be stored in a related database. Alternatively, records identifying a work sector that has been engaged by the operator and the relative permanence time can be stored. The parameters $\lambda_i$ and the matrices of transition probabilities $Q_i$ of the proposed mathematical model are determined and the distribution of waiting times is estimated before the human operator reaches the work sector "a" in which a task that request an activity in collaboration with the robot is to be performed.

Figure 1:
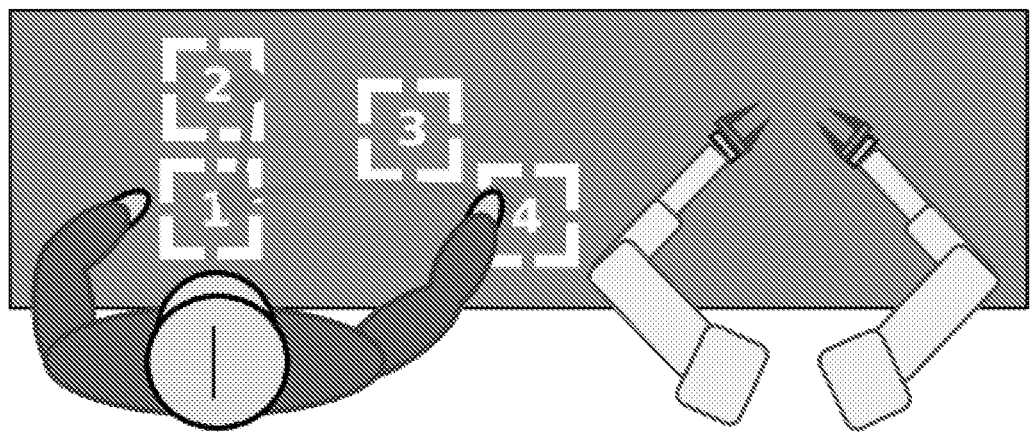
FIG. 1 shows an example of a work station of a human operator supported by a robot that cooperates with the operator.
Figure 8:
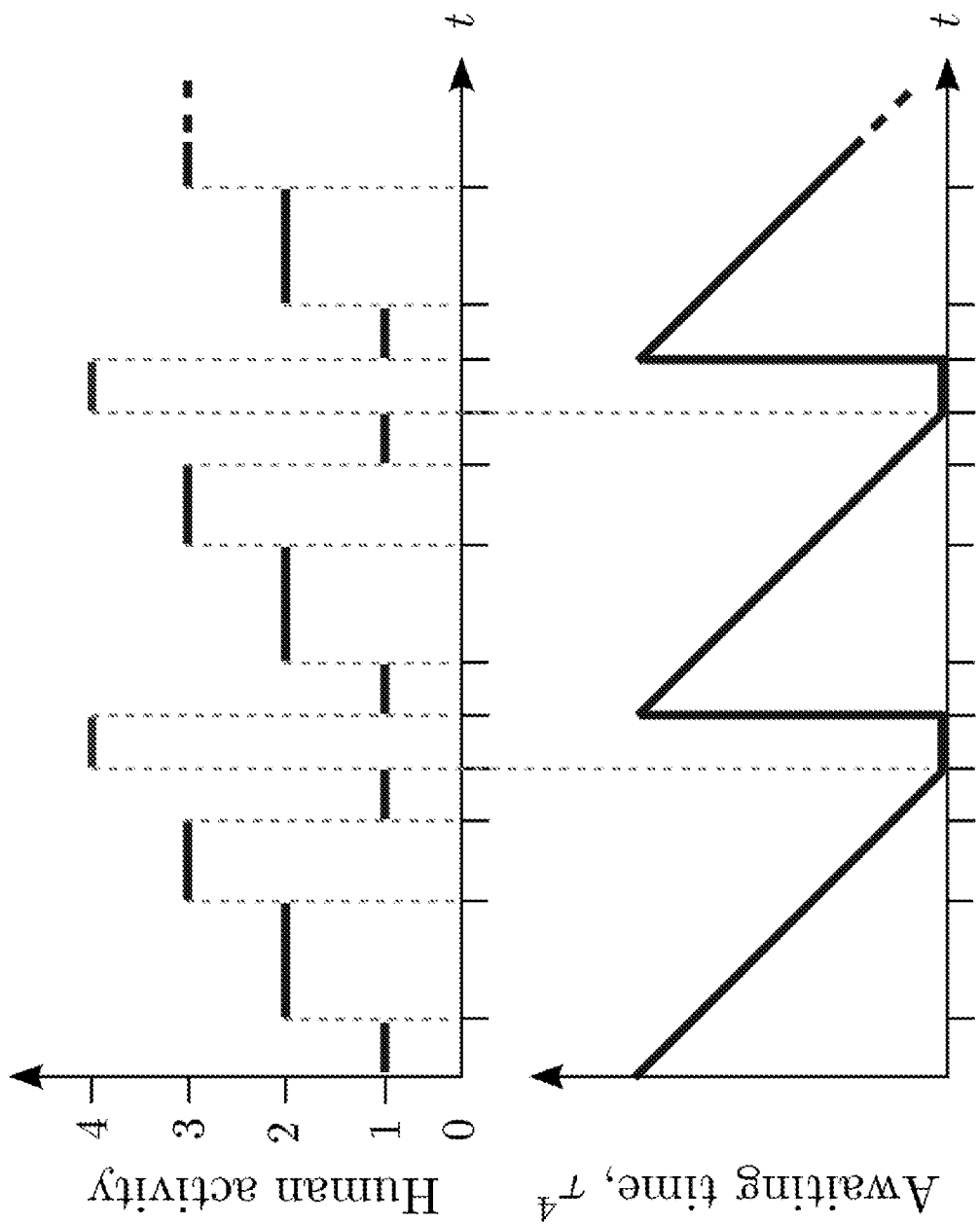
FIG. 8 describes an exemplary cyclical work sequence of a human operator, which successively engages the work sectors 1, 2, 3, 4 shown in FIG. 1.

Assuming for example that the sector of interest in which the robot must work with the human operator is the work sector number 4, the activity of the human operator could be represented by the time chart of FIG. 8, which describes a cyclical work sequence involving the work sectors 1, 2, 3, 4 of FIG. 1 in the following succession

1—2—3—1—4 with the relative permanence times. The method according to the present disclosure allows to estimate the instant by instant waiting time $\tau^4$ before the human operator moves into the work sector 4 to carry out an activity that requires the collaboration of the robot.

Thanks to the proposed method, implemented through a software executed by a microprocessor unit, the robot can be controlled so as to stop or otherwise organize their autonomous activity to prepare to collaborate with the human operator just in time, minimizing the downtime in which the robot or the human operator is stopped waiting for the other subject to be ready to carry out the activity in collaboration.

The invention claimed is:

1. A control method of at least one collaborative robot with a human operator, said method being implemented by means of a control system comprising detection devices, configured to detect a position of the operator's body or of his hands while the operator moves in a work space, a memory, a microprocessor control unit configured to process data stored in the memory and to control movements of a collaborative robot, the method comprising the following steps:

detecting a position of the operator's body or of his hands in distinct sectors of said work space;

storing in an orderly way first identifying data of occupied sectors of the work space occupied successively by the human operator while executing a task, and second identification data of respective permanence times in said occupied sectors of the work space, said first data stored in an orderly way defining a succession of work sectors progressively occupied by the human operator;

calculating, at each step of said sequence, a respective first probability distribution $P(A_{k+1}=a \mid A_{k-i}=k_i)$ of transition of the human operator in a generic first sector "a" of the work space, coming from a second sector "$k_i$" of the work space previously occupied a number "i" of steps backward in said succession from a generic third sector "$k_0$" currently occupied;

estimating, at each step of said sequence, a respective second probability distribution $P(A_{k+1}=a \mid A_k=k_0, \ldots, A_{k-n}=k_n)$ of transition of said human operator in said first sector "a" coming from the third sector "$k_0$" currently occupied, conditioned by a fact that at previous steps from 1 to n of said succession the human operator occupied the work sectors $k_1, \ldots, k_n$, respectively, as a linear combination of the probability distributions $P(A_{k+1}=a \mid A_{k-i}=k_i)$ of transition estimated at each step of said sequence, weighed with respective real positive parameters $\lambda_i$ determined so that $$\sum_{i=0}^{n} \lambda_i = 1;$$

estimating a probability distribution of occupation $\hat{X}_{k+1}$ of said generic first sector "a" coming from said generic third sector "$k_0$" currently occupied, as a function of said second probability distribution $P(A_{k+1}=a \mid A_k=k_0, \ldots, A_{k-n}=k_n)$ of transition;

determining values $\lambda_i$ of said parameters so as to minimize a standard deviation between said probability distribution of occupation $\hat{X}_{k+1}$ and an effective probability distribution of occupation $X_{k+1}$ detected by said succession of work sectors progressively occupied by the human operator;

estimating, on a basis of said stored permanence times, a future time of arrival of the human operator from the currently occupied third sector "$k_0$" in said first sector "a"; and controlling a robot upon said estimated probability distribution and said estimated time of arrival, so as to move the robot in said first sector "a" synchronously with the human operator's transition to said first sector "a".

2. The method according to claim 1, wherein said future time of arrival is estimated through the following operations:

identifying successions of transitions between work sectors which from the currently occupied third sector "$k_0$" lead to said first sector "a";

for each succession of transitions of said succession of transitions, calculating a respective probability for it to occur and calculating a respective waiting time to arrive in said first sector "a" as the sum of said permanence times in working sectors of the succession of considered transitions;

estimating said future time of arrival for each sequence of transitions in function of the respective probability of it of occurring and of said sum of permanence times.

3. The method according to claim 2, comprising the operations of:

discarding sequences of transitions whose respective waiting times from the current instant exceed a maximum value $\Delta T$;

discarding sequences of transitions whose respective probabilities of occurring are less than a minimum value $\varepsilon$.

4. A non-transitory computer readable medium having instructions stored thereon that, when executed by a microprocessor unit, cause the microprocessor unit to perform operations comprising:

detecting a position of a human operator's body or of his hands in distinct sectors of a work space;

storing in an orderly way first identifying data of occupied sectors of the work space occupied successively by the human operator while executing a task, and second identification data of respective permanence times in said occupied sectors of the work space, said first data stored in an orderly way defining a succession of work sectors progressively occupied by the human operator;

calculating, at each step of said sequence, a respective first probability distribution $P(A_{k+1}=a|A_{k-i}=k_i)$ of transition of the human operator in a generic first sector "a" of the work space, coming from a second sector "$k_i$" of the work space previously occupied a number "i" of steps backward in said succession from a generic third sector "$k_0$" currently occupied;

estimating, at each step of said sequence, a respective second probability distribution $P(A_{k+1}=a|A_k=k_0, \ldots, A_{k-n}=k_n)$ of transition of said human operator in said first sector "a" coming from the third sector "$k_0$" currently occupied, conditioned by a fact that at previous steps from 1 to n of said succession the human operator occupied the work sectors $k_1, \ldots, k_n$, respectively, as a linear combination of the probability distributions $P(A_{k+1}=a|A_{k-i}=k_i)$ of transition estimated at each step of said sequence, weighed with respective real positive parameters $\lambda_i$ determined so that $$\sum_{i=0}^{n} \lambda_i = 1;$$

estimating a probability distribution of occupation $\hat{X}_{k+1}$ of said generic first sector "a" coming from said generic third sector "$k_0$" currently occupied, as a function of said second probability distribution $P(A_{k+1}=a|A_k=k_0, \ldots, A_{k-n}=k_n)$ of transition;

determining values $\lambda_i$ of said parameters so as to minimize a standard deviation between said probability distribution of occupation $\hat{X}_{k+1}$ and an effective probability distribution of occupation $X_{k+1}$ detected by said succession of work sectors progressively occupied by the human operator;

estimating, on a basis of said stored permanence times, a future time of arrival of the human operator from the currently occupied third sector "$k_0$" in said first sector "a";

controlling a robot upon said estimated probability distribution and said estimated time of arrival, so as to move the robot in said first sector "a" synchronously with the human operator's transition to said first sector "a".

5. A control system of at least one collaborative robot with a human operator, comprising:

detection devices configured to detect a body position of the human operator or of his hands while the human operator moves in a work space, a memory, and a microprocessor control unit configured to process data stored in the memory and to control movements of a collaborative robot, wherein said memory has instructions stored thereon that, when executed by said microprocessor control unit, cause said microprocessor control unit to control the movements of a collaborative robot by performing operations comprising:

detecting a position of the operator's body or of his hands in distinct sectors of said work space;

storing in an orderly way first identifying data of occupied sectors of the work space occupied successively by the human operator while executing a task, and second identification data of respective permanence times in said occupied sectors of the work space, said first data stored in an orderly way defining a succession of work sectors progressively occupied by the human operator;

calculating, at each step of said sequence, a respective first probability distribution $P(A_{k+1}=a|A_{k-i}=k_i)$ of transition of the human operator in a generic first sector "a" of the work space, coming from a second sector "$k_i$" of the work space previously occupied a number "i" of steps backward in said succession from a generic third sector "$k_0$" currently occupied;

estimating, at each step of said sequence, a respective second probability distribution $P(A_{k+1}=a|A_k=k_0, \ldots, A_{k-n}=k_n)$ of transition of said human operator in said first sector "a" coming from the third sector "$k_0$" currently occupied, conditioned by a fact that at previous steps from 1 to n of said succession the human operator occupied the work sectors $k_1, \ldots, k_n$, respectively, as a linear combination of the probability distributions $P(A_{k+1}=a|A_{k-i}=k_i)$ of transition estimated at each step of said sequence, weighed with respective real positive parameters $\lambda_i$ determined so that $$\sum_{i=0}^{n} \lambda_i = 1;$$

estimating a probability distribution of occupation $\hat{X}_{k+1}$ of said generic first sector "a" coming from said generic third sector "$k_0$" currently occupied, as a function of said second probability distribution $P(A_{k+1}=a|A_k=k_0, \ldots, A_{k-n}=k_n)$ of transition;

determining values $\lambda_i$ of said parameters so as to minimize a standard deviation between said probability distribution of occupation $\hat{X}_{k+1}$ and an effective probability distribution of occupation $X_{k+1}$ detected by said succession of work sectors progressively occupied by the human operator;

estimating, on a basis of said stored permanence times, a future time of arrival of the human operator from the currently occupied third sector "$k_0$" in said first sector "a"; and controlling a robot upon said estimated probability distribution and said estimated time of arrival, so as to move the robot in said first sector "a" synchronously with the human operator's transition to said first sector "a".

6. The system according to claim 5, wherein said detection devices comprise one or more cameras for detecting the hands of the human operator in said work space.

7. The system according to claim 5, wherein said detection devices comprise a mat equipped with sensors arranged in said work space on which the human operator walks.

\* \* \* \* \*